April 3, 1951     T. SAXER     2,547,600
FRONT WHEEL DRIVING MECHANISM FOR BICYCLES
Filed Feb. 12, 1948
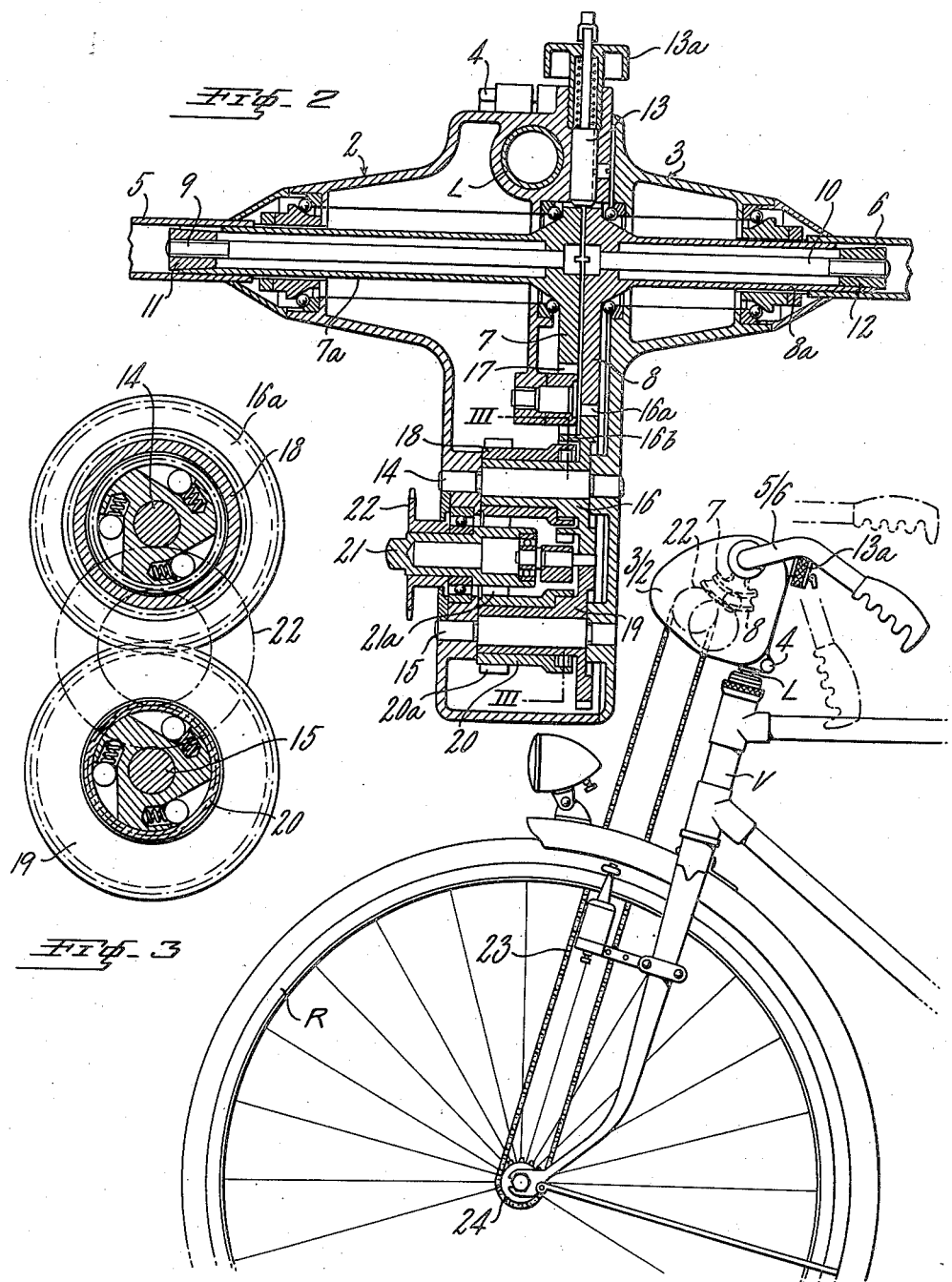
INVENTOR.
THEODOR SAXER
BY Patented Apr. 3, 1951

2,547,600

UNITED STATES PATENT OFFICE 2,547,600

FRONT-WHEEL DRIVING MECHANISM FOR BICYCLES

Theodor Saxer, Rorschach, Switzerland

Application February 12, 1948, Serial No. 7,988
In Switzerland February 12, 1947

5 Claims. (Cl. 280—245)

This invention relates to front-wheel driving mechanism for vehicles, in particular for bicycles. Many designs have already been suggested to use in bicycles and like vehicles the arms of the operator or cyclist for actuating a hand-operated gear that acts upon the front-wheel. On account of fundamental deficiencies of dynamic nature, however, none of known driving devices have practically been adopted up to the present time.

The invention tends to overcome heretofore known drawbacks of the front-wheel driving device or mechanism by arranging a gear case on top of the fork of the front-wheel of the bicycle inside of which case two handle bars are arranged which are pivotable in opposite directions and may be fixed in an intermediate position. At the inner ends of the handle bars are disposed adjacent toothed segments permanently fixed and meshing with spur-gears connected to a driving shaft by means of ratchet and pawl locks and further spur-gears. This driving shaft, arranged between the spur-gears, is coupled to a sprocket wheel laterally arranged outside the gear case and transmitting the force by means of a chain to its mate fixed to the hub of the vehicle's front-wheel, whereby direction of rotation remains always the same.

To this end, the mechanism is designed in such a way as to allow the handle bars to be readily and easily locked in their intermediate position in order to enable the operator to use them as a one-piece handle bar of the conventional or orthodox type.

Such a driving unit can be fixed to any standard bicycle no modification whatever being necessary as regards the rigid frame or the pedal gear.

For disabled cyclists, for instance, lame in one leg and able to use but one of the pedals, the present driving device renders assistance inasmuch as the cyclist will be in a position to drive safer and with more ease. Furthermore with such a driving device the multiple speed gear otherwise used to overcome gradients may be dispensed with, since due to the arm's co-operation, effectively more work will be performed.

An embodiment of the present invention is shown on the drawing wherein

Fig. 1 is a fragmental elevational view of the front portion of a bicycle frame with the front wheel thereof fitted with the driving device according to the invention, Fig. 2 is a horizontal section of the driving device across the longitudinal axis of the handle bar, and Fig. 3 is a section taken along line III—III of Fig. 2 and shown on a larger scale.

As shown in Figs. 1 and 2 the gear case 2 with cover 3 therefore is fixed to the shank of the handle bar sections or portions 5—6 which is vertically adjustable along the front fork tube V in the usual way and firmly held in position on said front fork by any known securing means. To this end, screw-bolts 4 may be employed engaging slots provided in the gear case 2. As seen in driving direction the right handle bar 5 is arranged at the right of the gear case and the left handle bar 6 at the left of the gear case cover, i. e. the handle bar 5 is fixed to the socket extension tube 7a of the gear segment 7 supported in ball bearings and the handle bar 6 to the socket extension tube 8a of the gear segment 8 also supported by suitable ball bearings. On threaded rod ends 9 and 10 are fitted conical sleeves 11, 12 which engage the inner hollow ends of the handle bars which are fixed in a conventional manner to longitudinally slotted ends of the socket extension tubes 7a and 8a, respectively. Due to such fixation the handle bars 5 and 6 can be turned to assume an intermediate position in the most convenient way and to be locked therein by the cyclist. In Fig. 1 for instance, such intermediate position of the handle bars 5, 6 is shown in full lines and in dot and dash lines the position for driving is illustrated, one bar being pulled up and its corresponding bar pressed down. As shown in the drawing the handles are given a so-called anatomical shape for the sake of a better grip and not the conventional cylindrical form. Inside the gear case is further arranged a spring-loaded catch bolt 13 which can be operated by means of a screw knob 13a projecting beyond the casing 2 so as to lock the two handle bars 5, 6 in their intermediate position should front wheel driving not be required, whereby this catch bolt 13 engages suitable notches of the hub of the gear segments 7 and 8, respectively.

Inside the gear case 2 at the front portion, two pins 14 and 15 parallel to the handle bars are lodged at some distance from each other. To one of these pins a wheel hub 16 is fixed carrying a large toothed rim 16a and a smaller toothed rim 16b. The toothed rim of the gear segment 8 directly meshes with the gear rim 16a, whereas the gear rim of the smaller gear segment 7, very much smaller in diameter, meshes with a pinion 17 which in turn meshes with the gear rim 16b of the wheel hub 16. On the cup-shaped portion arranged which, as may be seen on Figs. 2 and 3, together with the wheel hub 16 engages a ratchet pawl lock unit of known design provided with teeth at one of its ends. To the axle or pin 15 a wheel hub 19 (similar to 16), is fixed to mesh with it. As explained above, a hub portion 20, which is cup-shaped, is combined with the wheel hub 19 to form a ratchet and pawl lock unit. The sleeve 20 also is fitted with teeth 20a at one end. In the middle between the axles 14 and 15 a hollow axle 21 is supported by suitable ball bearings. Projecting beyond the gear case 2 is a sprocket wheel 22 which, by means of a chain 23, acts upon its mate sprocket 24 fixed to the axle of the front wheel R. The hollow axle 21 is fitted with teeth 21a inside the gear case thus meshing with the two hub sleeves 18 and 20.

The aforesaid driving device acts in the following way:

Let it be assumed that the cyclist were driving on the level without making use of the front wheel driving device and the handle bars are locked in their intermediate position by means of the catch bolt 13, thus allowing the two handle bars to be used in the ordinary manner of bicycle operation. If the cyclist wishes to increase the speed or to drive up-hill he will unlock the handle bars 5 and 6 by turning the screw knob 13a so that he can now operate the front wheel driving device in the following way:

While, for instance, the right leg bears on the pedal urging the same downwards, at the same time the right handle bar is pulled upwards by the right arm of the cyclist; then the left leg will move in upward direction and the left handle bar is urged down by the left hand. These operations will be executed alternately on the right and on the left each after half a revolution of the corresponding crank. Transmission of the motion inside the gear case will take place as follows:

When operating the handle bar section 5, the gear segment 7 will be rocked and its motion transmitted to the intermediate pinion 17 and from here to the gear rim 16b of smaller diameter on to the wheel center 16. At the same time by urging down the handle bar section 6 the gear segment 8 will be rocked directly acting upon the gear rim 16a of larger diameter. This angular displacement of the gear hub 16, i. e. of its gear rims will be transmitted to the spur gear 19 and the two wheel hubs 18 and 19 by means of the intermediate ratchet and pawl lock unit and the gear 21a alternatively urge the hollow axle 21 together with the sprocket wheel 22 fixed to it. The chain 23 transmits these driving forces or impulses to the sprocket wheel 24 and thus to the front wheel.

When with the subsequent driving impulse the handle bar 5 is being depressed and the handle bar 6 raised, the forces imparted to these bars again will act upon the wheel hub 16 with the difference, however, that instead of what has just been described, the hub sleeve 18 will be positively urged by the ratchet and pawl lock unit and the revolving motion thus produced again transmitted to the gear 21a of the hollow axle 21 and from here on to the front wheel R. The sprocket wheel 22, however, will always be rotated in the same direction.

By this operation, therefore, the alternate up and down motion of the handle bars 5 and 6 is converted into a continuous revolving motion acting upon the sprocket wheel 22 and drive the front wheel R, whereby the chain 23 is always exposed to a uniform load and thus kept taut.

The hub of the front wheel is best constructed as a free wheel hub in order to prevent the front wheel from being locked on pushing the bicycle backwards.

The advantage of the described driving device besides of the favorable utilization of the force in the cyclist's arms especially consists of the fact that the bicycle of orthodox construction in all its details will not be changed since the driving unit for the front wheel can be readily fixed to any bicycle, whatever. Furthermore, merely spur gears and the chain, the most reliable transmitting element, are made use of instead of bevel gears with their high loss by friction and of delicate transmitting means, such as Bowden or other metallic cables.

Owing to the simplified construction of the locking device according to this invention the handle bars when used as a one-piece bar may be readily locked, and may also be switched for use in the front wheel drive or vice-versa without any loss of time and in an easy manner.

Instead of using an intermediate pinion 17, as shown, power transmission from the gear segment 7 would also be possible by means of a double gear wheel acting upon the gear rim 16a.

It can thus be seen, that there has been provided according to the invention a driving mechanism for front wheels of bicycles and like vehicles having a fork, upon which is positioned a gear casing, two handle bar sections arranged for pivotal movement on said casing, said handle bar sections having inner ends and extending with their outer ends laterally beyond said gear casing, gear means within said casing and operatively connected to said inner ends of said handle bar sections, respectively, said gear means including two pins and a driven shaft below said handle bar sections and extending from within said casing therewithout, transmission means on said driven shaft for connecting the latter to said front wheel, said pins and said shaft being arranged in parallel relation to each other and to said inner ends of said handle bar sections, said handle bar sections being provided with respective actuating means establishing driving connection with said gear means, and ratchet means ensuring rotation of said driven shaft in one direction only upon movement of said handle bars and said actuating means.

Having thus described the invention, what is claimed as new and desired to be secured by Letters Patent, is:

1. A driving mechanism for bicycle front wheels having a fork, comprising a gear casing for position on top of said fork, two handle bar sections arranged for pivotal movement on said casing, said handle bar sections having inner ends and extending with their outer ends laterally beyond said gear casing, gear means within said casing and operatively connected to said inner ends of said handle bar sections, respectively, said gear means including two pins and a driven shaft below said handle bar sections and extending from within said casing therewithout, transmission means on said driven shaft for connecting the latter to said front wheel, said pins and said shaft being arranged in parallel relation to each other and to said inner ends of said handle bar sections, said handle bar sections being provided with respective actuating means establishing driving connection with said gear means, and ratchet means ensuring rotation of said driven shaft in one direction only upon movement of said handle bars and said actuating means.

2. A driving mechanism according to claim 1, including means extending from within said casing therewithout and operable to engage said actuating means of said handle bar sections to block the latter in predetermined position.

3. A driving mechanism according to claim 1, wherein said actuating means form two toothed segments one for each handle bar, one of said segments being smaller in size than the other of said segments.

4. A driving mechanism according to claim 3, wherein one of said gear means on one of said pins is engageable by both said toothed segments.

5. A driving mechanism according to claim 1, wherein said actuating means form two toothed segments one for each handle bar, one of said segments being smaller in size than the other of said segments and, wherein both said segments are provided with tubular extensions, and means coupling said tubular extensions to said handle bars.

THEODOR SAXER.

REFERENCES CITED

The following references are of record in the file of this patent:

UNITED STATES PATENTS

| Number | Name | Date |
|---|---|---|
| D. 105,813 | Stark | Aug. 24, 1937 |

FOREIGN PATENTS

| Number | Country | Date |
|---|---|---|
| 222 | Great Britain | 1896 |
| 176,516 | Switzerland | June 17, 1935 |